United States Patent

Thompson

[15] 3,652,433
[45] Mar. 28, 1972

[54] ELECTROLYTIC SOFTENING OF WATER
[72] Inventor: Ralph Brewster Thompson, Oak Brook, Ill.
[73] Assignee: Nalco Chemical Company, Chicago, Ill.
[22] Filed: Oct. 9, 1968
[21] Appl. No.: 766,050

[52] U.S. Cl. ............................204/152, 204/149, 204/240, 204/275, 204/276
[51] Int. Cl. ......................................................C22d 1/02
[58] Field of Search ............................................204/149–152

[56] References Cited

UNITED STATES PATENTS

| | | | |
|---|---|---|---|
| 1,746,964 | 2/1930 | Polatsik | 204/149 |
| 1,901,652 | 3/1933 | Kean | 204/151 |
| 2,640,026 | 5/1953 | Whittington | 204/149 |
| 3,006,826 | 10/1961 | Roller | 204/149 |
| 3,441,488 | 4/1969 | Onstott | 204/149 |

Primary Examiner—T. Tung
Attorney—Hill, Sherman, Meroni, Gross & Simpson

[57] ABSTRACT

A method of deionizing water having a dissolved solids content consisting largely of relatively insoluble calcium and magnesium salts by passing through the water a unidirectional electric current of sufficient voltage between electrodes immersed in the water to effect ionization thereof and recovering water substantially deionized and of a lesser degree of hardness. The electrolytic system includes a horizontally disposed container, preferably of dielectric structural material, for the feed water, horizontally spaced electrodes in the container between which the feed water is introduced and controlled means for removing substantially deionized water laterally of the electrodes and other controlled means for removing settled solids from below the space between the electrodes. The anode electrode is inert toward electrolytic action, while the cathode electrode need not be inert since under the conditions of operation it is not substantially corroded.

4 Claims, 4 Drawing Figures

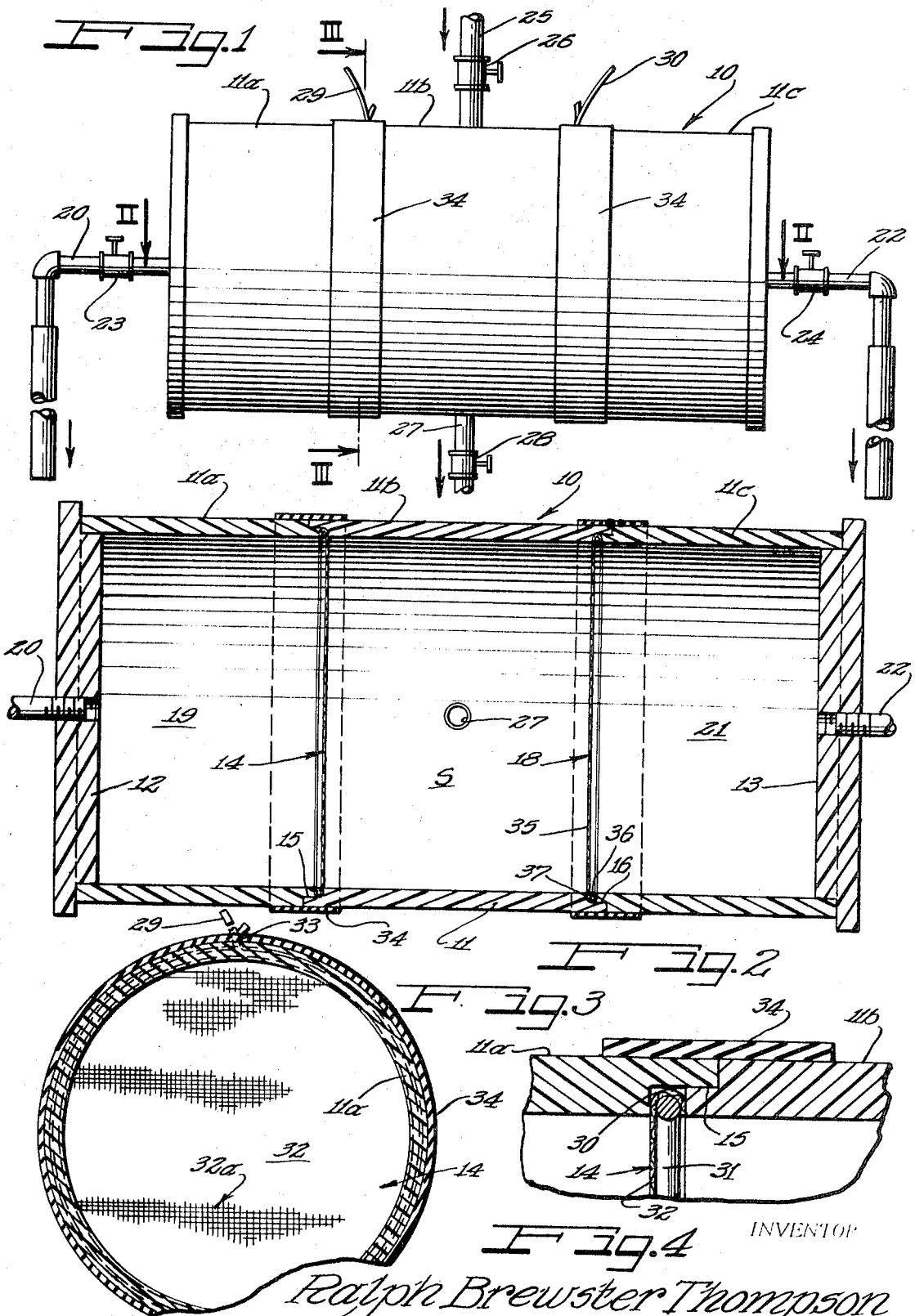

ELECTROLYTIC SOFTENING OF WATER

SUMMARY OF THE INVENTION

The invention relates to a method for the deionization and softening of natural waters containing a dissolved solids content consisting largely of relatively insoluble calcium and somewhat more soluble magnesium salts, and only negligible quantities of non-hardness-forming salts, such as sodium chloride, insufficient to render the water appreciably conductive of electricity. The electrolytic deionization of the water is carried out in a system that includes a horizontally disposed container for the water, a pair of spaced electrodes adapted to be immersed in the water within the container, and controlled outlets disposed laterally of the electrodes for the withdrawal of deionized water, together, optionally, with a controlled outlet below the space between the electrodes for the intermittent removal of water and any concentration therein of settled solids. The anode is formed in an inert but electrically conductive material such as platinum or other inert heavy metal or alloy, carbon, graphite, or the like; and the cathode can be formed of any suitable conductive material, such as ferrous metal, stainless steel, or the like, since it is not subjected in operation to appreciable corrosion.

A unidirectional current, capable of imposing a voltage differential of between a minimum of about 4 to 5, and preferably of about 10 to 15 volts, and a maximum of not over about 100 volts, and preferably not over 50 volts, is established between the electrodes. A current having a voltage between these limits that is sufficient to effect a flow of electrical current between the electrodes of between about 1 and 20, and preferably 1 to 10 milliamperes per square centimeter (ma./sq. cm.) is effective to cause a deionization of the water, especially at the cathode, whereby a substantially deionized effluent can be withdrawn laterally thereof. The system can be operated either continuously or batch-wise. If continuous, the flow of feed water through the system is controlled as to rate of volume flow so as to effect the desired degree of deionization and/or softening of the water, the degree being dependent upon the purposes for which the deionized water is to be used.

DESCRIPTION OF THE DRAWING

FIG. 1 is a side elevational view of apparatus suitable for carrying out the electrolytic system of my invention;

FIG. 2 is a horizontal sectional view taken substantially along the line II—II of FIG. 1;

FIG. 3 is a sectional view taken along the line III—III of FIG. 1; and

FIG. 4 is a fragmentary, enlarged sectional view of a joint between container sections.

ON THE DRAWING

The reference numeral 10 indicates generally a suitable container, or tank of highly dielectric structural material and of circular cross section. The container is preferably elongated and positioned with its longer dimension horizontal. Said container 10, as shown, has a cylindrical wall 11 comprising a plurality of jointed sections 11a, 11b, and 11c, and vertical end walls 12 and 13. An electrode 14, serving as the cathode, suitably supported at a section joint 15, extends transversely of the tank in spaced relation to the end wall 12 to provide a compartment 19 for the collection of deionized water passing through the cathode 14 toward an outlet 20 positioned in the end wall 12. A second electrode 18, serving as the anode, is mounted transversely of the tank at a section joint 16 in spaced relation to the end wall 13 to provide a compartment 21 for deionized water. The end wall 13 is provided with an outlet 22 for lateral flow thereof from the compartment 21. The outlets 20 and 22 are controlled by valves 23 and 24, respectively, to regulate the effluent from the compartments 19 and 21.

Feed water is introduced into the space S between the cathode 14 and anode 18 through a feed line 25 controlled by a valve 26. From the space S the feed water flows in opposite directions laterally through the cathode 14 and the anode 18, to their respective outlets 20 and 22. The tank 10 is also provided with an outlet 27 having a valve 28 for the withdrawal of water and any collection of settled solids from the space S at a controlled rate or at intermittent periods.

The cathode 14 and the anode 18 are each connected externally, as by wires 29 and 30, to a suitable source of unidirectional electric current, such as DC electricity, (not shown). The cathode 14 is formed of any suitable ferrous metal, such as stainless steel, while the anode 18 is formed of an inert material, such as platinum or other heavy metal or alloy, carbon, graphite, or the like. A voltage differential from a minimum of about 5.0, and preferably not less than about 10 volts, but not over a maximum of about 100 volts, and preferably not over 50 volts is established between the cathode 14 and the anode 18. Since the feed water introduced through the valve controlled inlet 25 is practically nonconductive of electricity, a sufficient voltage differential must be established to provide a current of about 1 to 20 milliamperes per square centimeter, the current density selected being such as to cause a deionization of the water in its flow laterally through the cathode 14 and anode 18 from the space S.

As best shown in FIGS. 3 and 4, each section joint, such as at 15, is formed by an interfitting tongue and groove construction of the opposed ends of the sections 11a and 11b, but with an annular inner space 30 therebetween for the reception of the electrode, in this case the cathode 14. The electrode 14 suitably comprises a metal wire ring 31 and a porous or foraminous disk 32, the periphery of which is partially wrapped around said ring 31. The annular space 30 is of such dimensions as to receive snugly the wrapped ring 31 and hold the ring and associated disk 32 securely in place.

The cathode 14 can be formed of a foraminous or perforate disk of a ferrous metal, such as a stainless steel screen, or other porous fabric, as indicated at 32a. The ends of wire ring 31 are carried out through a hole 33 (FIG. 3) to provide the connecting wires 29 to the source of unidirectional current. A band 34 of flexible electrician's tape is wound around the container at the joint 15 to seal the joint.

Similarly, the anode 18 comprises a porous disk of fabric 35 supported by a ring 36 and secured in an annular inner space 37. The anode, however, is formed of material that is inert to and not attacked by any electrolytic action set up in the operation of my system. For this purpose, the anode can be of platinum, or of carbon or graphite, a graphite fabric or a graphitized glass fiber fabric being suitable. The ring 36 should also be of inert material with suitable strength, such as platinum wire.

It will be understood, of course, that the apparatus illustrated and described is of the laboratory type and that other forms of construction for commercial use can be readily devised.

DETAILED DESCRIPTION OF THE METHOD

The source of water supplied as feed water to my deionized system is, in general, a natural water containing a dissolved solids content of from 50 to 2,000 p.p.m. hardness calculated as $CaCO_3$, with only negligible quantities of non-hardness forming salts, such as sodium chloride. Accordingly, the feed water is substantially nonconductive because of the substantial absence of highly ionized salts and only becomes conductive when a sufficiently high voltage is impressed upon the electrolytic system that includes the cathode 14 and the anode 18.

The following examples will serve to illustrate the method of my invention. These examples are given by way of illustration only and not by way of limitation:

EXAMPLE NO. I

In this example both electrodes were formed of graphite cloth to avoid introducing any metal ions into the electrolytic system. Data were obtained as to the deionization at the cathode or anode where the feed water initially had the following analysis:

| | p.p.m. |
|---|---|
| Calcium, calculated as $CaCO_3$ | 265 |
| Magnesium, calculated as $CaCO_3$ | 290 |
| Chlorine, calculated as NaCl | 68 |
| Sulfate, calculated as $Na_2SO_4$ | 408 |

After runs A and B series of about 8 hours on successive days under the conditions indicated below, the analysis of the final cathode effluent was as shown:

| Run | Volts | Current density milliamps/ sq. cm. | Cathode Effluent Analysis | | | |
|---|---|---|---|---|---|---|
| | | | $Ca(CaCO_3)$ | $Mg(CaCO_3)$ | Cl(NaCl) | $SO_4(Na_2SO_4)$ |
| A-1 | 42 | 4.4 | 8 | 37 | 12 | 33 |
| B-1 | 42 | 4.4 | 4 | 63 | (¹) | 13 |
| A-2 | 18 | 1.5 | 9 | 8 | (¹) | 36 |
| B-2 | 18 | 1.5 | 6 | 90 | 5 | 57 |

¹ Trace.

The final anode effluent corresponding to the above A and B series gave the following analysis:

| Run | Volts | Current density milliamps/ sq. cm. | Anode Effluent Analysis | | | |
|---|---|---|---|---|---|---|
| | | | $Ca(CO_3)$ | $Mg(CaCO_3)$ | Cl(NaCl) | $SO_4(Na_2SO_4)$ |
| A-1 | 42 | 4.4 | 80 | 77 | 104 | 773 |
| B-1 | 42 | 4.4 | 55 | 55 | 104 | 773 |
| A-2 | 18 | 1.5 | 69 | 109 | 132 | 1,000 |
| B-2 | 18 | 1.5 | 72 | 92 | 105 | 956 |

As shown by the foregoing data, the deionizing effect is most pronounced in the cathode effluent, where a decrease in hardness (total Ca and Mg calculated as $CaCO_3$) of from 555 in the feed water to a minimum of 17 (A-2) and a maximum of 96 (B-2) was found in the cathode effluent.

EXAMPLE NO. II

In this example, the electrolytic system was that shown schematically in the drawing, except that both electrodes comprised 50 mesh (U.S. Standard) stainless steel screens coated with 0.002 inch thickness of a fluorcarbon (Teflon). A potential of about 42 volts DC was applied across the electrodes.

Initially there was no detectable current flow through the feed water in space S. The feed water was hard water containing 325 p.p.m. Ca as $CaCO_3$ and 289 p.p.m. Mg as $CaCO_3$, or a total of 614 p.p.m. of equivalent $CaCO_3$.

Conductivity was established in about one-half hour and the current increased slowly, leveling off at about 1.5 to 4.4 milliamperes (ma.) per square centimeter. Corrosion occurred at the anode as shown by the formation of ferric hydroxide.

Two runs were made on successive days on the same feed water above mentioned, and after the indicated number of hours analyses were made of the cathode and anode effluents, the voltage being maintained at about 42 volts and the current density within the range of from 2 to 5 ma. cm.²:

RUN LN-30

| | Anode | | | Cathode | | |
|---|---|---|---|---|---|---|
| | Vol. cc. effluent | P.p.m. as $CaCO_3$ | | Vol. cc. effluent | P.p.m. as $CaCO_3$ | |
| | | Ca | Mg | | Ca | Mg |
| Time, minutes: | | | | | | |
| 0 | 0 | | | 0 | | |
| 150 | 213 | | | 108 | | |
| 190 | 279 | | | 145 | | |
| 240 | 348 | 162 | 201 | 205 | 43 | 28 |
| 295 | 421 | 150 | 188 | 252 | 51 | 14 |

RUN LN-31

| | Anode | | | Cathode | | |
|---|---|---|---|---|---|---|
| | Vol. cc. effluent | P.p.m. as $CaCO_3$ | | Vol. cc. effluent | P.p.m. as $CaCO_3$ | |
| | | Ca | Mg | | Ca | Mg |
| Time, minutes: | | | | | | |
| 0 | 0 | | | 0 | | |
| 60 | 64 | | | 102 | | |
| 120 | 142 | | | 193 | | |
| 180 | 214 | | | 264 | | |
| 235 | 293 | | | 323 | | |
| 305 | 333 | | | 423 | | |
| 365 | 377 | | | 533 | | |
| 420 | 446 | 188 | 78 | 598 | 66 | 12 |
| 495 | 508 | 56 | 86 | 655 | 60 | 39 |

In Run LN-31 no analysis was made of the effluents for anions. Accordingly, a further run LN-31A, was made, using feed water of an analysis similar to that in LN-30 and LN-31, and carried out for 8½ hours, during the last 40 minutes of which two samples were taken, with the following results:

| | Ca as $CaCO_3$, p.p.m. | Mg as $CaCO_3$ p.p.m. | Cl as NaCl, p.p.m. | $SO_4$ as $Na_2SO_4$, p.p.m. |
|---|---|---|---|---|
| Feed | 353 | 275 | 66 | 425 |
| Cathode effluent | 83 | 4 | 14 | 96 |
| Anode effluent | 31 | 24 | 180 | 638 |

NOTE.—The current density was maintained at 10 ma./cm.².

I claim as my invention:

1. The method of substantially deionizing water containing dissolved relatively insoluble, hardness-forming salts, which consists essentially of establishing a confined horizontally disposed flow path,
positioning a pair of spaced water-porous electrodes vertically arranged for immersion in said flow path to provide an inner compartment therebetween and compartments outwardly thereof, flowing feed water into said inner compartment for free flow outwardly thereof through said respective porous electrodes into said outer compartments, passing a unidirectional electric current between said electrodes through the water in said inner compartment under a differential voltage of at least 5 volts and not over about 100 volts for a sufficient length of time to effect a substantial deionization of said water, and collecting said substantially deionized water in said outwardly arranged compartments.

2. A method as defined by claim 1, wherein said electrodes are foraminous fabrics freely permeable to the flow of water therethrough.

3. A method as defined by claim 2, wherein solids settling out in said inner compartment are withdrawn therefrom.

4. A method as defined by claim 1, wherein the current density is maintained at about 1 to 10 milliamperes per square centimeter and the voltage is maintained at about 10–50 volts for a period of time of at least about 8 hours.

* * * * *